Feb. 24, 1959 E. FEDERICI 2,874,469
DEVICE FOR LOCATING THE TRANSVERSE
ROTATION AXIS OF THE HUMAN JAW
Filed July 23, 1956
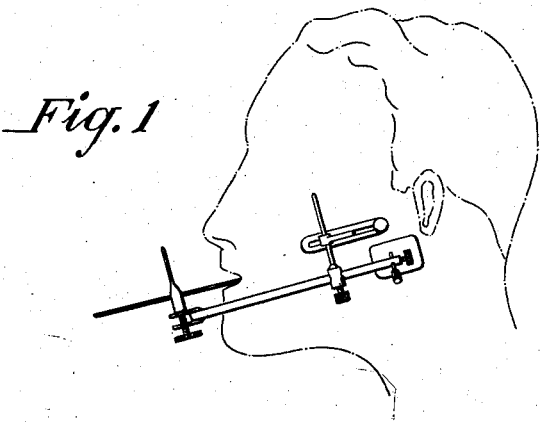
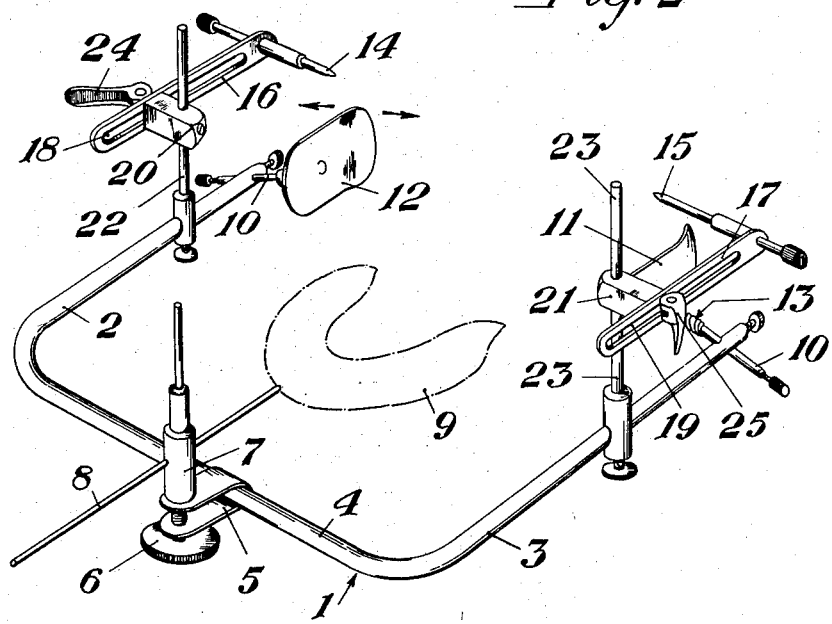
INVENTOR.
EDMONDO FEDERICI
BY United States Patent Office 2,874,469
Patented Feb. 24, 1959

2,874,469

DEVICE FOR LOCATING THE TRANSVERSE ROTATION AXIS OF THE HUMAN JAW

Edmondo Federici, Sulmona, Italy

Application July 23, 1956, Serial No. 599,575

Claims priority, application Italy July 26, 1955

3 Claims. (Cl. 32—20)

The present invention relates to a device for detecting and reproducing the rotational transverse axis of the human lower jaw, in order to allow for the spatial construction of said axis, as necessary for embodying the total dentures.

An appendant object of this invention is that of showing the inclination of the glenoid cavity so as to allow the accurate detection of said data by the dentist for reproducing them on an articulator of a substantially known type so as to reproduce with the most accuracy the movement of the considered articulation, particularly starting from a closed mouth position.

The device according to this invention allows the embodiment, on an articulator, either of the rotational pivot points of the lower jaw, or at least of points as close as possible to the actual rotational pivot points of said lower jaw.

This invention is grounded on the observation that it is possible to bring the plane containing the instantaneous pivot points of the human jaw to a horizontal plane, on the horizontal axis about which the swinging movement of the jaw occurs. In fact all of said rotational centers are aligned on a straight line, at either side, at right angles to the straight line through said two rotational centers, so that the point corresponding to the desired center may be found at the intersection of said straight lines with the front vertical plane passing through the rotational horizontal axis of the jaws in the vertical plane.

For attaining such a result it is sufficient to avail of an articulator of a substantially known type having the two axes in a single plane allowing the jaws angular movement of the jaws to be reproduced in a horizontal plane through the mobility of the sole lower mandible arch, but it is also necessary to avail of a device allowing the transverse rotational axis of the mandible to be detected with the most possible accuracy in order to allow said axis to be located in the articulator.

The device according to this invention is directed to such a purpose and said device comprises substantially an arc-shaped member suitable to be applied to a person's lower jaw, said arc-shaped member being provided with supporting means for a small shaped plate to be applied to the lower gums of the patient.

To said arc-shaped member, in a more or less close position to its application point on the jaw, and on either side is mounted an upright supporting, by orientable and extensible links, a pin whereby it is possible to accurately find the two intersection points of the rotational axis with the outer surface of the person's face so as to detect the spatial location of said axis which, by known techniques is then reproduced on the articulator.

A preferred form of embodiment of the device according to this invention will be particularly described, with reference to the attached drawings wherein:

Fig. 1 is a side elevational view showing the device applied to the patient's head, and Fig. 2 is a perspective view, in an enlarged scale, of the device.

With reference to the drawings the device comprises an arc-shaped member 1, made either of metal or of any other material, including two parallel portions 2 and 3 connected to one another by the central portion 4.

A movable support 5 is mounted on said central portion 4, and said support is provided with a set screw 6. The support 5 carries a sleeve 7 which is passed through by the rod 8 the end of which, inside the arc-shaped member, carries the small shaped plate 9 to be applied to the gum arch within the patient's mouth.

At the ends of the parallel portions 2 and 3 of the arc-shaped member 1, are mounted the clamp devices therefor, comprising the rods 10, passing diametrically through the associated portions 3 and 2 of the arc-shaped member. Said rods carry, by an articulated support the contoured plates 11 and 12 apt to be received on the patient's cheeks.

On the rod 10 are mounted the helical springs (only the spring 13 being shown in Fig. 2), serving for holding the contoured plates applied to the face of the patient for locating the arc 1.

When the device has been settled as shown in Fig. 1, one may proceed to search the points corresponding to the axis of the articulation, said search being carried out by the two pins 14 and 15 carried at the ends of slotted fillets 16 and 17 which by their longitudinal slots 18 and 19, respectively, may glide on studs (not shown in figure) carried by the blocks 20 and 21.

The latter blocks 20 and 21 may vertically glide on the uprights 22 and 23 fastened to the lateral portions 2 and 3 of the arc 1.

The blocks 20 and 21 are provided with a set screw so as to fasten said blocks to their position on their respective uprights. The studs whereon the slots 18 and 19 glide, are provided with an eccentric clamp 24 and 25 for fastening at their desired positions the associated fillet 16 or 17.

Thus, the pins 14 and 15 are articulatedly supported so as to be able to reach, within a reasonable range, any position on the patient's face.

At such a position said pins may be fastened by the aforesaid clamping means.

When the pins have been steadily fastened, the unit may be used either for detecting the inclination of the glenoid cavity, or it may be applied on a substantially known articulator for the spatial embodiment of the transverse rotational axis of the mandible, as it is necessary for the proper embodiment of total dentures.

I claim:

1. A device for locating the transverse rotation axis of the human jaw, which comprises in combination a U-shaped frame applicable to a jaw in a substantially horizontal plane at the height of the lower jaw of the patient, said U-shaped frame having a bore transversely thereof at the end of each leg, a plate applicable to the gum arch of the patient, said plate being mounted on the base of the U-shaped frame for displacement parallel to the legs of the frame and perpendicular to the base of the U-shaped frame, two contoured plates applicable against the cheeks of the patient for fastening the frame to the face of the patient, a rod located in each transverse bore of the leg of the U-shaped frame, one of said plates being mounted on each rod, a screw mounted at the end of each leg of the U-shaped frame and coaxial therewith for fastening said rods to the said legs, a pin on each leg of the frame perpendicular to the leg and turned toward the inside of the frame, and a supporting unit for each pin, each supporting unit being slidable on one leg of the frame, said pins being mounted on said supports for movement in the three directions of space for locating the ends of the transverse rotation axis of the jaw.

2. A device as claimed in claim 1, wherein each of said contoured plates is articulated to the end of one of said rods and a spiral spring is mounted on each of said rods and is inserted between said contoured plate and a leg of the frame to keep said contoured plate against the face of the patient.

3. A device as claimed in claim 1, wherein the supporting unit for each pin comprises an upright member having close to the lower end thereof a bore for slidably receiving a leg of the frame, screw means in said upright member for fastening said upright member on the said leg, a block mounted on said upright member, said block being slidable on the upright member in a vertical direction perpendicular to the leg of the frame, screw means in said block for fastening said block to the said upright member, a flat fillet having a longitudinal slot therein slidably mounted on the free end of the said block and slidable in a direction parallel to the leg of the frame, clamping means extending through said longitudinal slot for fixing said fillet with respect to the said block, said fillet having therein at the end opposite to the base of the frame a transverse bore, said pin freely slidable in said bore in a direction perpendicular to the leg of the U-shaped frame.

References Cited in the file of this patent

UNITED STATES PATENTS 894,983     Prothero  ---------------  Aug. 4, 1908